United States Patent

Bradbury

[15] 3,679,002
[45] July 25, 1972

[54] APPARATUS FOR PULLING ROW CROPS

[72] Inventor: Keith Douglas Bradbury, Juramento 3361, 7°, "B", Buenos Aires, Argentina

[22] Filed: Dec. 3, 1969

[21] Appl. No.: 881,937

[30] Foreign Application Priority Data

Dec. 17, 1968  Argentina................................218576

[52] U.S. Cl..............................................................171/56
[51] Int. Cl. .....................................................A01d 25/04
[58] Field of Search...................................................171/56

[56] References Cited

UNITED STATES PATENTS

| | | |
|---|---|---|
| 1,711,990 | 5/1929 | Coatsworth................................171/56 |
| 1,719,871 | 7/1929 | Burts..........................................171/56 |
| 1,787,026 | 12/1930 | Verhoff.....................................171/56 |

*Primary Examiner*—Antonio F. Guida
*Attorney*—Otto John Munz

[57] ABSTRACT

A harvester of row-crops attachable to and powered by a tractor, comprising a harvesting-grasper for pulling row crops from the ground.

A plurality of pivoted levers are equipped each with a grasper blade. Through cam action the relating grasper blades enter the soil, are moved together to grasp the crop plants, lift them out of the ground and discharge them.

1 Claim, 8 Drawing Figures

Patented July 25, 1972

INVENTOR
Keith D. Bradbury
BY
ATTORNEY

Patented July 25, 1972
3,679,002
2 Sheets-Sheet 2
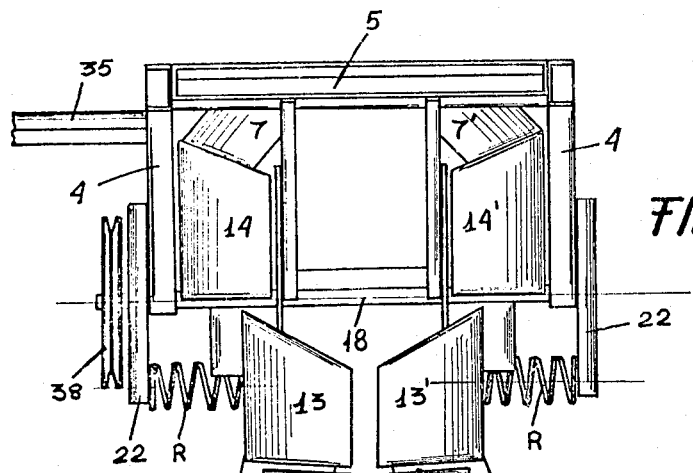
FIG. 4
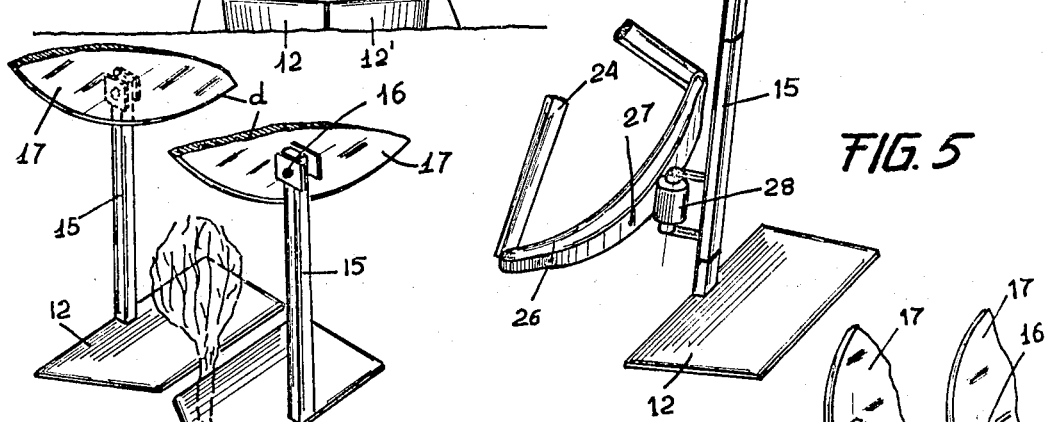
FIG. 5
FIG. 6
FIG. 7
FIG. 8
INVENTOR
KEITH D. BRADBURY
BY Otto John Munz
ATTORNEY

APPARATUS FOR PULLING ROW CROPS

FIELD OF THE INVENTION

The present invention refers to an apparatus for pulling out plants sown in rows.

The harvesting of plants bearing a crop so close to the ground that on being scythed great losses are incurred due to the destruction of the product by the cutter blade, creates a well-known problem. Such is the case of beans, chicken peas, soy beans, peas, lentils, etc. On the other hand, the pulling out by hand of said plants, avoiding the scythe, still further increases labor costs, which are high enough when scything is applied. The aforementioned difficulty is made greater by large-size weeds growing within the rows of said plants.

SUMMARY OF THE INVENTION

One of the purposes of the present invention is to provide an apparatus for pulling plants sown in rows in such a manner as to overcome the aforesaid inconveniences without incurring in loss of grain.

Another of the purposes of the present invention consists in providing an apparatus as stated above which is capable of pulling out large weeds encountered in the row of crop plants.

The third object of the present invention consists in providing an apparatus such as the one indicated above and which is not susceptible to damage by stones or large roots entering between the apparatus blades.

As its fourth purpose, the present invention is to provide an apparatus as indicated above, capable of pulling out all the row plants notwithstanding the fact that said plants may not be sufficiently well aligned, the blades of the apparatus being widely separated and its use, therefore, not calling for any great precision in sowing.

A fifth purpose of the present invention consists in providing an apparatus as indicated above, capable of lifting plants which accidentally are lying loose on the ground, possibly due to a stalk broken by the wind. Such plants would thus be recovered and their loss avoided.

A sixth purpose of the present invention consists in providing an apparatus as described above, capable of pulling the plants even though they are separated by different distances along the row, the tangential rotational speed of the apparatus blades being made to vary with regard to the traveling velocity of the apparatus.

A seventh purpose of this invention resides in providing an apparatus of the kind indicated, adapted to deposit the plants, after same have been pulled, on a conveyor belt or other device.

These and other purposes of the present invention are fully explained in the present specification, illustrated for greater clarity and ready understanding with a preferred example, said example to be considered as being of a non-restrictive nature.

IN THE DRAWINGS:

FIG. 4 is a view through line IV—IV of FIG. 1.

FIG. 5 illustrates a detail of the cam mechanism.

FIG. 6 shows a set of two blades at the moment of exerting pressure on a plant stalk in order to commence the pulling operation.

FIG. 7, similar to FIG. 6, shows the stage following the pulling of the plant.

FIG. 8, similar to FIG. 7, shows the set of blades transferring the pulled (illustrated in part).

In the above figures, like signs correspond to like or similar parts throughout the drawings.

Figure 1:
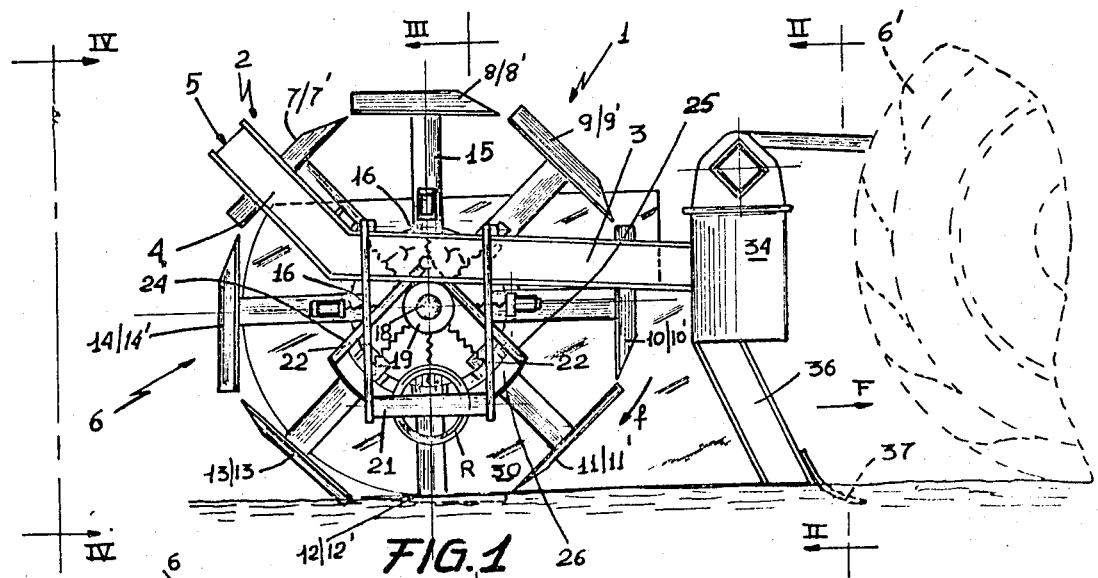
FIG. 1 illustrates a side view of the proposed apparatus, joined to a farm machine such as a tractor (illustrated partially).
Figure 2:
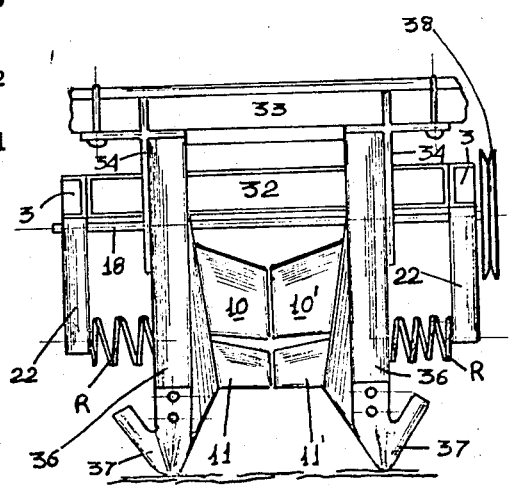
FIG. 2 is a section through axis II—II of FIG. 1.

As shown in the drawings, the apparatus 1 as proposed by the present invention, consists of a channel-section frame 2 (FIG. 1) having horizontal legs 3 bent upwardly at the inclined portions 4 close to web 5 of said channel section (FIGS. 1 and 2). Said frame 1 has the double purpose of joining the apparatus 1 to the tractor 6' and of maintaining in rotary suspension the double wheel of blades 6 formed by eight sets of blade pairs 7/7', 8/8', 9/9', 10/10', 11/11', 12/12', 13/13', and 14/14'. Each one of said blades is provided with an integral arm 15 the free end of which is pivoted by means of pin 16 (FIG. 3) to a disc 17. Pins 6 are circumferentially and equidistantly distributed along an imaginary circle, concentrical to and of smaller diameter than the circle corresponding to the perimeter of said disc 17. It is to be noted that this arrangement is repeated symmetrically and that consequently there are eight blades, pivoted as shown, on one disc 17 and a further eight blades pivoted on the other similar disc 17, each pair of opposing blades, pivoted to different discs, forming a set of blades and thus providing the aforementioned eight sets of blades comprising said wheel 6.

Both discs 17 (FIG. 3) are vertical and separated from one another by a distance $d$. On the other hand, said discs are arranged coaxially on shaft 18, forming integral part thereof, said shaft 18 being mounted rotatingly with regard to bushings 19 respectively forming integral part of the frame legs 3. In this manner, the blade wheel 6 rotatingly suspended, as stated above, in the aforementioned frame 2.

Each one of arms 15 is biased in the direction of arrow $f$ by a spring $r$ which, at one end thereof, engages said arm 15 and at the other end is connected to bushing 20, the latter being coaxial to shaft 18 and forming integral part of same. On the other hand, the two legs 3 of frame 2 are integrally joined to horizontal bars 21 attached to the frame by means of two vertical bars 22, at the rate of two vertical bars 22 for each horizontal bar 21 (FIGS. 1 through 4). The ends (eventually single-piece of welded) (FIG. 1) of two radial bars 24 and 25 are pivoted by means of respective pins 23 to each of both horizontal bars 23. These two radial bars 24 and 25 are equal and form between them an angle of less than 180°. Precisely at the end common to both (eventually integrally joined together), which — if single-piece — would be represented by a simple elbow, said radial bars, as stated, are pivoted to a respective pin 23 as regards the respective horizontal bar 3 of frame 2. This arrangement is repeated symmetrically at both sides of the double blade wheel 6. (In connection with FIG. 3 it is to be understood that blade 7 is hidden behind blade 8; and that blade 7' is hidden behind blade 8'; see also FIG. 1).

Both radial bars 24 and 25 (FIG. 1) are in engagement by their free ends with a crown sector 26 (FIGS. 1, 3 and 5) the height of which, in the axial direction thereof (i.e., in a direction parallel to shaft 18, FIG. 3), increases gradually from the ends of the crown sector 26 towards the intermediate crosswise section, defining a cam profile 27 (FIG. 5). Said cam profile 27 (which is likewise symmetrical in wheel 6 of the blades of apparatus 1 proposed by the present invention) can engage each of rollers 28 (FIGS. 3 and 5) rotatably mounted in said blades, at the rate of one roller 23 for each blade of double wheel 6. Springs R (FIGS. 1, 3 and 4), intercalated between bar 21, already mentioned, cooperate to produce said periodic engagement of each blade and the respective crown sector 26. Owing to the symmetry of blade wheel 6 (FIGS. 3 and 4) there are thus provided in total two springs R with the above-explained arrangement.

Consequently, while springs $r$ (FIG. 3) tend to separate the two blades constituting each pair or set of wheel blades, in any position of said wheel 6, the symmetrical springs R tend to bring closer together those two blades the rollers 28 of which (FIGS. 3 and 5) engage the profile of cam 27 of the crown sector 26. This operation takes place in a progressive fashion and likewise permits the separation of aforesaid blades in a progressive manner at the rate that the respective rollers 28 terminate their path of engagement with cam profile 27 due to springs $r$.

Figure 3:
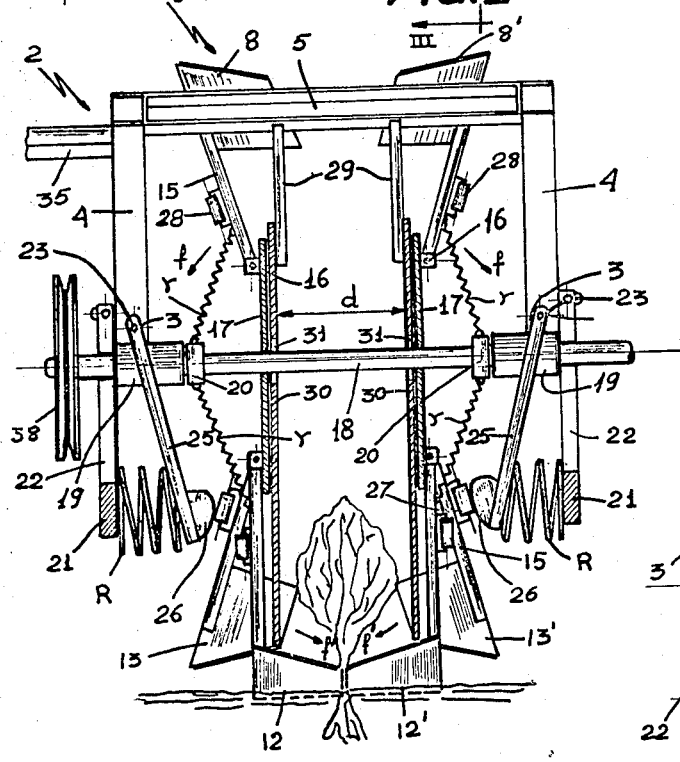
FIG. 3 is a section through axis III—III of FIG. 1.

The proposed apparatus 1 (FIG. 3) is complemented by a driven pulley 38 kinematically correlatable by means of a movement-transmitting member such as, for example, a V-belt (not illustrated) leading to the pulley (not illustrated) of the tractor (foreign to the power take off invention) but partially shown in FIG. 1. Said driven pulley 38 forms integral part of abovementioned shaft 18, being mounted coaxially thereon. Furthermore, two rugged plates 29 are integrally pendant from crosspiece 5 (FIG. 3). The respective lower ends thereof form integral part of flats 30, arranGed vertically and separated from one another by a distance X approximately equal (although not exactly) to the distance $d$ between the abovementioned discs 17. Each one of both flats 30 contains respective openings 31 which are coaxial and opposite and through which the abovementioned shaft 18 passes freely.

The free ends of both horizontal legs 3 (of frame 2, see FIG. 1) are connected together by means of crosspiece 32 (FIG. 2). For greater clarity, blades 9/9' (see FIG. 1) have been omitted from this FIG. 2, as likewise the inclined arms 4 and the web 5 of frame 2 (the latter being hidden, on the other hand, by crosspiece 33). This crosspiece 33 (forming integral part — FIGS. 1 and 2 — of frame 2 of apparatus 1, by means of crosspiece 32, of the ends of legs 3 and of plates 34 integrating also other cooperating reinforcement members) forms parts of a frame structurally joining apparatus 1 as proposed by the present invention, in such a manner that said double blade wheel 6 of said apparatus be suspended rotatingly (FIGS. 1, 2, 3 and 4) while driven pulley 38, thereof (FIG. 3), receives the rotary movement from the tractor drive power take off pulley. Said frame consisting of crosspiece 33 and element 34, as well as of other cooperating members (FIGS. 1 and 2) can, in this manner, allow that optionally apparatus 1 be secured to the front, the rear or the side of the tractor (for this latter case said frame is provided with bar 35 —(FIGS 3 and 4), to join the apparatus 1 to the tractor side without prejudice to the kinematic relation between the respective pulleys thereof). The attachment of apparatus 1 to the front part of the tractor will be preferred when there is danger that the tractor itself destroy the plants to be pulled (before the apparatus 1 attend to their removal). The attachment of apparatus 1 to the rear portion of the tractor (figure 1) will be preferred in those cases where, due to the small height of the plants and the great height of the lower parts of the tractor, when there is no danger that the latter destroy the plants when passing over the rows. As regards the side emplacement of apparatus 1 relative to the tractor, engagement by means of bar 35 (FIGS. 3 and 4) will be preferred when there is danger that the tractor destroy the plants before same are pulled by the apparatus and, on the other hand, it is desireable that the operator have direct visual control of the task he is performing.

On the other hand (FIGS. 1 and 2) the frame comprising crosspiece 33 is integrally joined to two inclined bars 36 ending in respective harrows 37 the purpose of which is to form the respective furrows for the blades to enter when reaching the position in which they close in order to pull out the plant.

OPERATION IS AS FOLLOWS

The apparatus 1 proposed by the present invention is connected to tractor 6' in the manner shown in FIG. 1. When the tractor travels in the direction of the arrow F, wheel 6 turns in the direction of the arrow $f$ (FIG. 1) owing to the motive power which the tractor power take off drive pulley (not illustrated) transmits to the driver pulley 38 of apparatus 1 (FIG. 3). Owing to the rotation of the driven pulley 38, integral shaft 18 also rotates together with boths discs 17 comprising wheel 6 (FIG. 3). Consequently, the eight blades of each disc 17 turn facing the blades of the other disc 17 inasmuch as each blade is pivotally connected to the respective disc 17 by means of the corresponding pin 16. While this rotation of wheel 6 takes place, both blades of each pair, facing one another, (one for each disc) remain mutually separated, as in the case of blades 8 and 8' shown in FIG. 3. This is due to the fact that the respective spring $r$ (rotating together with the corresponding bushing 20 forming integral part of rotary shaft 18) of each blade tends to "open" same, i.e., to maintain one blade separate from the other owing to the biasing $f$ by said spring $r$.

Nevertheless, when thus rotating, roller 28 of a given blade (and in the same manner the roller corresponding to the opposite blade) enters into contact with cam profile 27 (FIGS. 1, 3 and 5) of the respective crown sector 26 and said cam profile biases the corresponding roller 28, and consequently the blade to which it belongs, to shorten the distance separating it from the opposite blade (and reciprocally) towards a "closing position" between both blades, as happens with blades 12 and 12' shown in FIG. 3. The blades, for this reason, tent to close in the direction of the arrows $f'$.

With regard to the relation between the tangential speed of rotation of the blades and the travelling speed of the tractor, said relation defines the distance between two immediate positions in which the lower blades of the wheel are closed, said distance being subject to control by the operator. (If a stone should happen to oppose the closing of the blades, such an obstacle would not cause seizing or breakage inasmuch as springs R would give way until the stone cease obstructing the closure of the blades).

Each one of both lower blades (for example 12 and 12' in FIG. 3) begins to close, i.e., to approximately contact one another, when he respective rollers 28 (FIG. 5) start their engagement with one end of the cam profile 27. Closure (maximum approximation between opposing blades) takes place when respective roller 28 arrives at the middle point of the trajectory along the respective cam profile 27; this moment corresponds to the position indicated in FIGS. 3 and 6. Inasmuch as double blade wheel 6 continues turning, the plant whose stalk has been caught between both confronting blades 12 and 12' (or those blades which are in a lower position corresponding to the respective plant) is pulled out by the turning of wheel 6, as shown in FIG. 7, passing from the lower position of wheel 6 to a lateral position, i.e., to a higher level until each roller 28 of the respective blade 12 or 12' is free of engagement with cam profile 27. The biasing of springs $r$ now becomes effective. In fact, each of both springs $r$ retract the respective blade outwardly, i.e., opening the set of the two blades 12/12' (or that set of blades whose turn it is to be operative). As the set of blades 12/12' opens (FIG. 8) the plant falls on to a conveyor belt T for example or simply falls on to the ground to form a row of pulled plants, or falls on to any other collecting apparatus.

It is to be pointed out that harrows 37 (FIG. 2), previously to the passage of wheel 6, operate to provide the corresponding furrows permitting the closure of the confronting blades (in a lower position of the wheel) entirely below ground level, i.e., below the fruits of the plants, thus avoiding destruction of part of the product, as actually does happen when scything is applied. Consequently, all the grain is harvested. It is likewise to be pointed out that the closure pressure between confronting blades (for example 12 and 12', FIG. 3) owing to the rotation of wheel 6 and the action of the respective cam profile 27 on the corresponding roller 28 of each of both blades, is sufficiently great to pull out the large weeds which are growing in the row of crop plants. Finally, it is to be pointed out that the pulled plants (FIG. 6) are disengaged from the blades only after having been lifted to a certain level, thus facilitating their transference to the conveyor belt or other apparatus used for their reception.

Undoubtedly the present invention, when being put into practice, is subject to alterations without this implying any departure from the principles clearly specified in the attached claims.

Having thus particularly described and determined the nature of the present invention and the manner in which same is to be put into practice, it is declared that what is claimed as exclusive property and invention is:

1. An apparatus for pulling row crop plants;
    comprising a frame with means for joining same to a tractor frame, the frame of said apparatus being provided with an aperture in which a wheel is partially located, said wheel consisting of two parallel plates separated by a given distance, a horizontal shaft passing through said plates at right angles and forming an integral part thereof, the ends of said shaft projecting from said plates and from the space provided between them and being rotatingly and coaxially mounted in and with respect to corresponding bushings, each of both bushings respectively forming integral part of aforementioned frame, said shaft and wheel being rotated by power take off means from said tractor, the said integral parts constituting means to assure parallelism between said shaft forming integral part of said plates and the axle common to both rear wheels of the tractor to which said frame is joinable;

each one of both faces of each plate directed towards the end closest to the integral shaft thereof, being provided with a plurality of pivots, on which pivot radial arms, circumferentially and equidistantly distributed around an imaginary circle concentric with regard to said shaft forming integral part of the plates, the corresponding first ends of the said respective radial arms with regard to said imaginary circle being articulated in aforesaid pivots and the second end of each of said arms terminating in a blade being a grasper forming an angle between 70° and 110° to the axis of the said respective arm at the point where same is joined to the blade and respective said arm, there being provided for each blade pivoted to one of said plates a similar opposing blade pivoted to the other plate, two of said plates facing each other at their edges remote from their respective arms, each blade being provided with a first spring, each of said first springs being connected by one end to a point of the respective arm close to the respective pivot with regard to the corresponding plate, while at the other end each of said springs is joined to a point of the frame close to said shaft forming integral part of the plates, the said first springs constituting means of separation between the facing blades pivoted to the respective plates by means of the corresponding said arms, a crown segment being provided at each side exterior to the space comprised between both plates, said segment being substantially concentric with regard to said shaft forming integral part of the plates, the concavity of both crown segments being directed upwardly and each crown segment being, at a certain distance below said shaft forming an integral part of the plates, pivoted to the latter about the respective axis which is substantially perpendicular to the said shaft forming an integral part of the plates, with regard to said frame, each one of both croWn segments are presenting a respective cam profile the height of which increases from the ends thereof towards the center in a direction which is substantially perpendicular to said plates, a roller being mounted rotatably in each one of said arms, said roller being engageable with said respective cam profile, there being provided between each one of said crown segments and a respective member forming integral part of the frame, a second spring as a means cooperating, but yieldingly, to move together each of two opposing plates the edges of which are facing each other.

\* \* \* \* \*